United States Patent
Zhao et al.

(10) Patent No.: US 11,498,227 B2
(45) Date of Patent: Nov. 15, 2022

(54) ROBOT POSE DETERMINATION METHOD AND APPARATUS AND ROBOT USING THE SAME

(71) Applicant: UBTECH ROBOTICS CORP LTD, Shenzhen (CN)

(72) Inventors: Yongsheng Zhao, Shenzhen (CN); Zhichao Liu, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 407 days.

(21) Appl. No.: 16/709,931

(22) Filed: Dec. 11, 2019

(65) Prior Publication Data

US 2021/0060802 A1    Mar. 4, 2021

(30) Foreign Application Priority Data

Aug. 28, 2019  (CN) .......................... 201910800816.5

(51) Int. Cl.
*B25J 19/02* (2006.01)
*G05B 13/04* (2006.01)
*B25J 9/16* (2006.01)

(52) U.S. Cl.
CPC .......... *B25J 19/022* (2013.01); *B25J 9/1605* (2013.01); *B25J 9/1684* (2013.01); *G05B 13/048* (2013.01)

(58) Field of Classification Search
CPC ...... B25J 19/022; B25J 9/1605; B25J 9/1684; B25J 9/1692; B25J 19/0095; B25J 9/1694; G05B 13/048; G05B 2219/39033; G01S 17/875
See application file for complete search history.

(56) References Cited

U.S. PATENT DOCUMENTS

| | | | |
|---|---|---|---|
| 2004/0073360 A1* | 4/2004 | Foxlin .................... | G01C 21/16 342/357.31 |
| 2018/0314324 A1* | 11/2018 | Abed Aljawad .... | G06F 3/04842 |
| 2018/0341022 A1* | 11/2018 | Guo ....................... | G01S 7/4808 |
| 2019/0122386 A1* | 4/2019 | Wheeler ................. | G01S 17/42 |
| 2019/0235083 A1* | 8/2019 | Zhang ...................... | G01S 7/51 |

* cited by examiner

*Primary Examiner* — Adam R Mott
*Assistant Examiner* — Elizabeth Rose Neleski

(57) ABSTRACT

The present disclosure provides a robot pose determination method including: collecting laser frames; calculating a current pose of the robot in a map pointed by a first pointer based on the laser frames, and obtaining an amount of the laser frames having been inserted into the map pointed by the first pointer; inserting the laser frames into a map pointed by the first pointer, if less than a first threshold; inserting the laser frames into the map pointed by the first pointer and a map pointed by a second pointer, if greater than or equal to the first threshold and less than a second threshold; and pointing the first pointer to the map pointed by the second pointer, pointing the second pointer to a newly created empty map, and inserting the laser frames into the map pointed by the first pointer, if equal to the second threshold.

19 Claims, 6 Drawing Sheets

ROBOT POSE DETERMINATION METHOD AND APPARATUS AND ROBOT USING THE SAME

CROSS REFERENCE TO RELATED APPLICATIONS

This application claims priority to Chinese Patent Application No. 201910800816.5, filed Aug. 28, 2019, which is hereby incorporated by reference herein as if set forth in its entirety.

BACKGROUND

1. Technical Field

The present disclosure relates to robot technology, and particularly to a robot pose determination method as well as an apparatus and a robot using the same.

2. Description of Related Art in the case that a lidar odometer is used as the front end of a lidar based simultaneous localization and mapping (SLAM) system, its precision and quality of mapping can be improved by improving its precision. The lidar odometer performs matchings between lidar data frames, calculates the inter-frame displacements, and obtains a pose (i.e., the position and the posture) of a device corresponding to the current lidar data frame by performing a pose integration on the displacement and the pose of the device corresponding to the previous lidar data frame. In this process, there are errors in the matchings between frames, and these errors will gradually accumulate, which causes the positioning of the lidar odometer to gradually drift out and become misaligned.

In order to solve this problem, in the prior art, there are technical solutions which create a sub-map through a fixed window and that through a sliding window. In the conventional manner of creating a sub-map through a fixed window for laser matching, the amount of the lidar data frames is fixed, and the map is destroyed and a new map is reconstructed after the amount of the lidar data frames inserted into the map reaches a preset amount. In this way, when the amount of the lidar data frames inserted into the sub-map is small, the precision of mapping will be low. In the manner of creating a sub-map through a sliding window for laser matching, the pose of the most recent lidar data frames of a fixed amount corresponding to each frame is stored to create the map. Whenever a new lidar data frame is to be inserted, the oldest stored frame is deleted to maintain the fixed amount of the frames, then the map is re-created to perform matching. In this way, whenever a new lidar data frame is to be inserted, it needs to reconstruct the map and insert the frames of the fixed amount, which requires a large amount of calculation.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. It should be understood that, the described embodiments are part of the embodiments of the present disclosure, not all of the embodiments. All other embodiments obtained by those skilled in the art based on the embodiments of the present disclosure without creative efforts are within the scope of the present disclosure.

Figure 1:
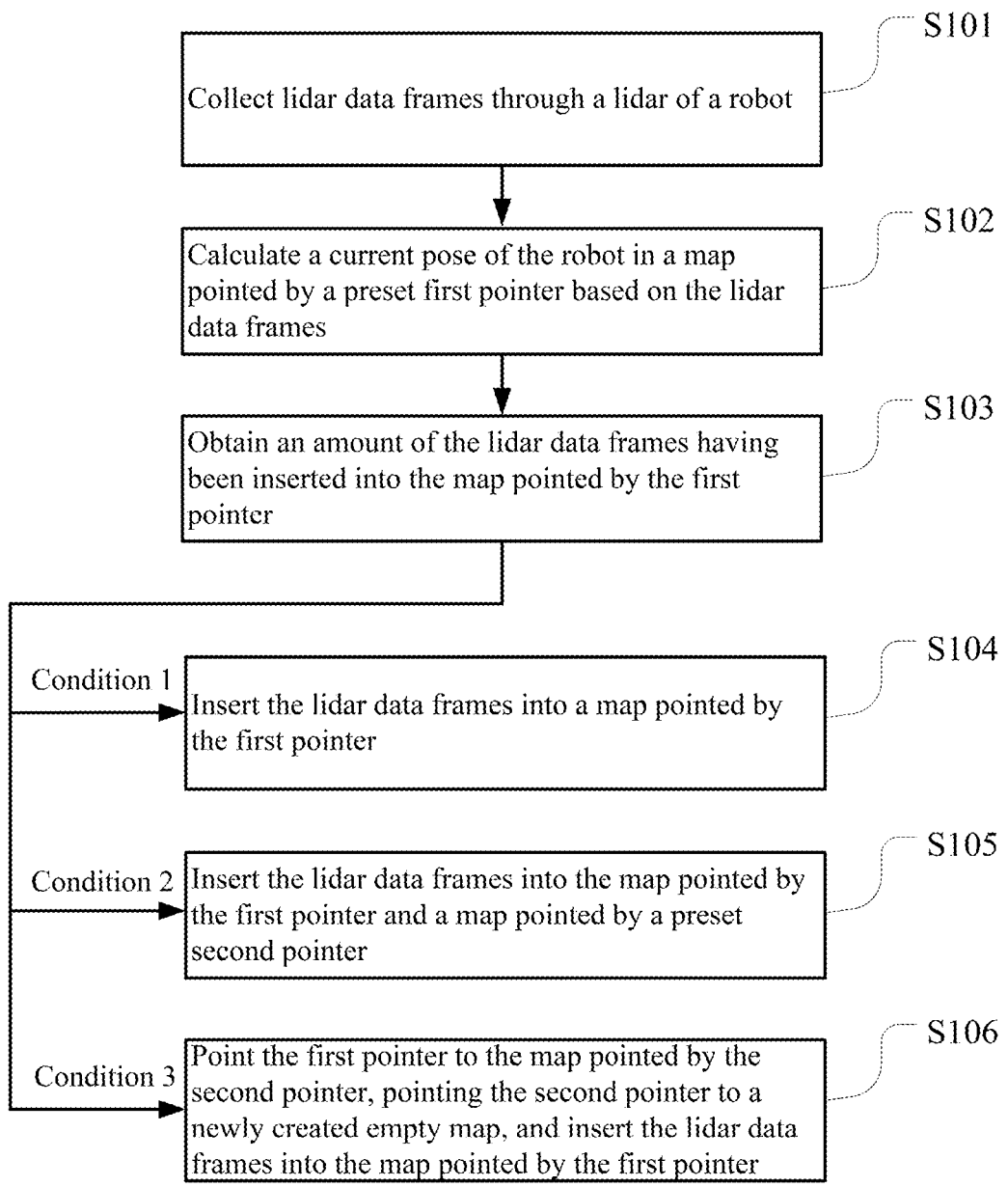
FIG. 1 is a flow chart of an embodiment of a robot pose determination method according to the present disclosure.
Figure 5:
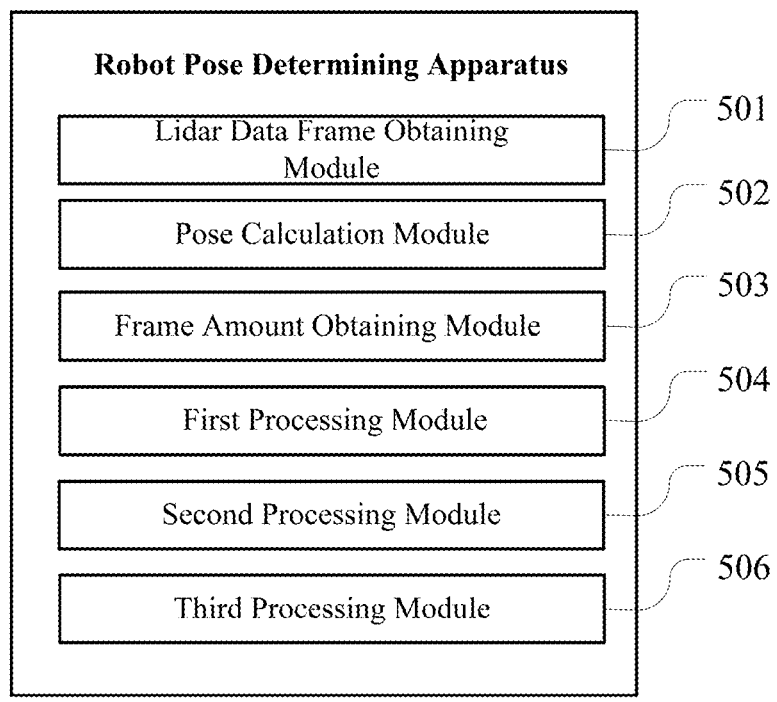
FIG. 5 is a schematic block diagram of an embodiment of a robot pose determination apparatus according to the present disclosure.
Figure 6:
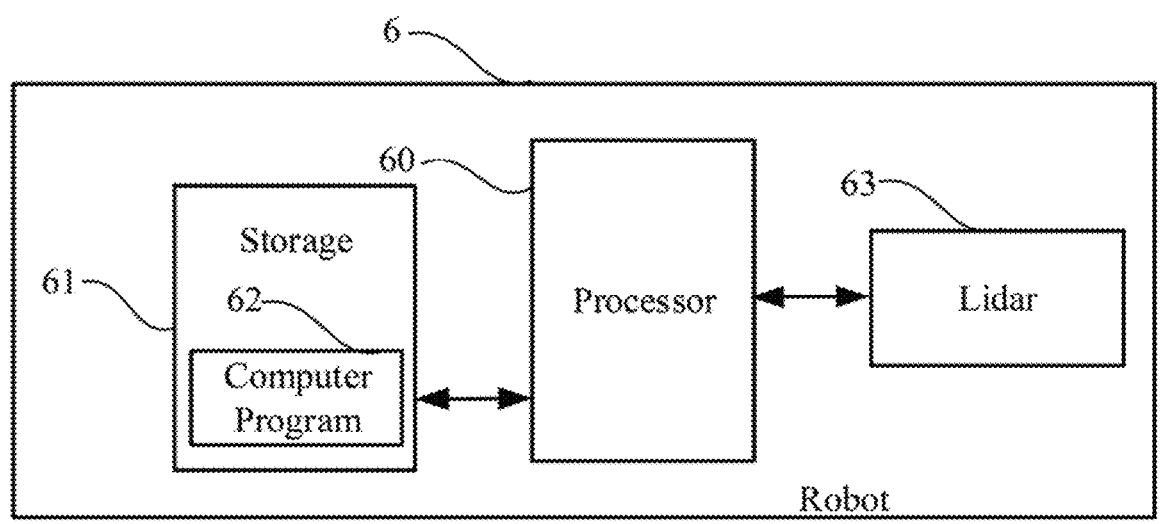
FIG. 6 is a schematic block diagram of an embodiment of a robot according to the present disclosure.

FIG. 1 is a flow chart of an embodiment of a robot pose determination method according to the present disclosure. In this embodiment, a pose determination method for a robot is provided. The method is a computer-implemented method executable for a processor, which may be implemented through and applied to a robot pose determination apparatus as shown in FIG. 5, a robot as shown in FIG. 6, or implemented through a computer readable storage medium. As shown in FIG. 1, the method includes the following steps.

S101: collecting lidar data frames through the lidar of the robot.

In this embodiment, the collection time of the lidar data frame can also be read while obtaining the lidar data frame, which is indicated as t_lidar herein. After the lidar data frame is obtained, it can be further filtered to remove the points that are too far and too close to avoid the interference to the eventual calculation result of the pose and improve the precision of the calculation of the pose (i.e., the position and the posture).

S102: calculating a current pose of the robot in a map pointed by a preset first pointer based on the lidar data frames.

In this embodiment, for a lidar data frame which is the first frame, a new empty map can be created, then make the first pointer to point to the map, and then set the current pose as a preset initial pose, where the initial pose is the center of the map pointed by the first pointer, which is indicated as: pose: {x, y, theta}={0, 0, 0}.

Figure 2:
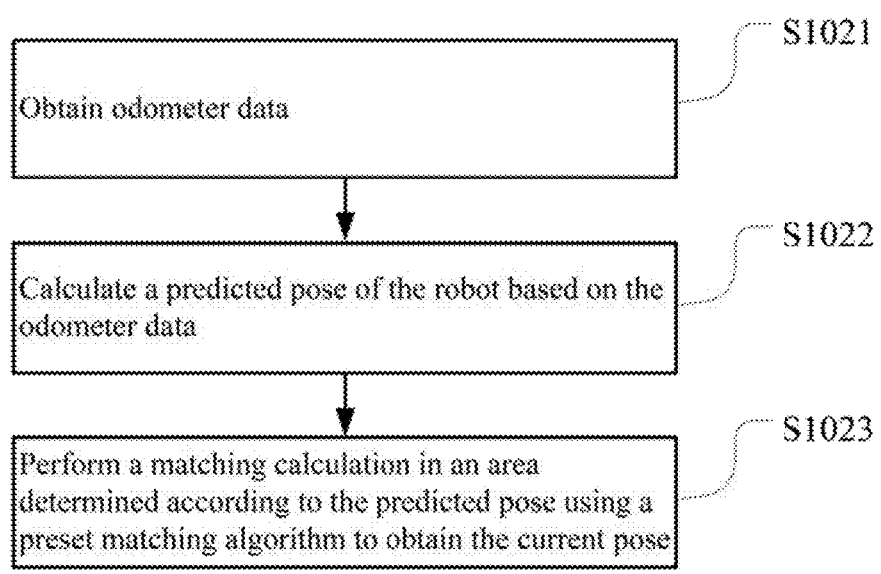
FIG. 2 is a flow chart of an example of calculating a current pose of a robot in a map in the method of FIG. 1 according to an embodiment of the present disclosure.

FIG. 2 is a flow chart of an example of calculating a current pose of a robot in a map in the method of FIG. 1 according to an embodiment of the present disclosure. As shown in FIG. 2, for a lidar data frame which is not the first frame, the current pose can be calculated through the following steps.

S1021: obtaining odometer data.

The odometer data can be data of a wheel odometer, data of an inertial measurement unit (IMU), or data of a chassis odometer that combining the two, which takes the pose when the wheel odometer is turned on as the origin.

S1022: calculating a predicted pose of the robot based on the odometer data.

In this embodiment, it can calculate the predicted pose of the robot based on the following formula:

$$\text{pose\_odom\_predict} = p\_odom + v*(t\_lidar - t\_odom);$$

where, pose_odom_predict is the predicted pose, p_odom is the pose in the odometer data, v is the velocity in the odometer data, t_lidar is the collection time of the lidar data frame, and t_odom is the collection time of the odometer data.

S1023: performing a matching calculation in an area determined according to the predicted pose using a preset matching algorithm to obtain the current pose.

Figure 3:
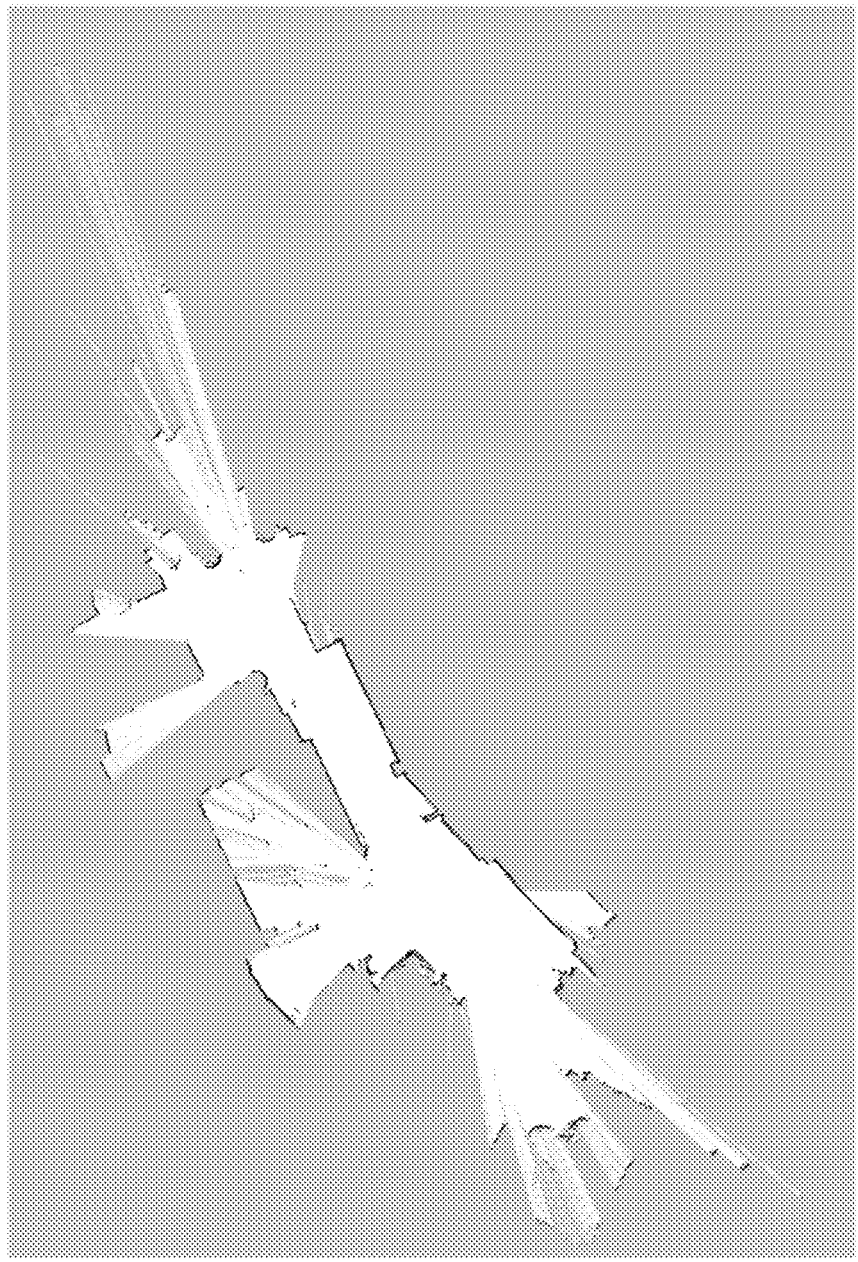
FIG. 3 is a schematic diagram of an example of a map pointed by the first pointer in the method of FIG. 1 according to an embodiment of the present disclosure.

FIG. 3 is a schematic diagram of an example of a map, where data address of the map is pointed by the first pointer. The first pointer is denoted as SUBMAP (see FIG. 4). As shown in the map of FIG. 3, the black part is an obstacle, the white part is a blank area, and the gray part is an unknown area. In the map, an area centered on the predicted pose can be determined, for example, the area can be a circular area centered on the predicted pose, and its radius can be set in advance according to actual needs. In other embodiment, the area can also be set to a rectangle or other shape, which is not limited herein. A PCL (point cloud library) matching or a template search matching algorithm can be used in the area to match the existing information on the map to obtain the best matching pose, and the best matching pose can be used as the current pose, which is indicated as matched pose, and its corresponding matching score is indicated as "score".

S103: obtaining an amount of the lidar data frames having been inserted into the map pointed by the first pointer.

For a newly created empty map, the amount of the lidar data frames is initialized to 0, and whenever a lidar data frame is inserted into the map, the amount of the lidar data frames can be counted through a preset counter. If condition 1 is met, that is, the amount of the lidar data frames is less than the preset first threshold, step S104 is executed; if condition 2 is met, that is, the amount of the lidar data frames is greater than or equal to the first threshold and less than the preset second threshold, the step S105 is executed; and if condition 3 is met, that is, the amount of the lidar data frames is equal to the second threshold, step S106 is executed.

The values of the first threshold and the second threshold can be set according to actual needs. In this embodiment, the second threshold can be set to be twice the first threshold; and the first threshold is indicated as n/2, and the second threshold is indicated as n, where n is an even number greater than two.

S104: inserting the lidar data frames into a map pointed by the first pointer.

S105: inserting the lidar data frames into the map pointed by the first pointer and a map pointed by a preset second pointer.

Herein, the second pointer is denoted as SUBMAP_BACKUP (see FIG. 4), and the form of the map pointed by SUBMAP_BACKUP is similar to the map pointed by SUBMAP shown in FIG. 3. For details, refer to the foregoing description, which are not described herein. It should be noted that, the map pointed by the second pointer is an empty map at the time of initial creation.

S106: pointing the first pointer to the map pointed by the second pointer, pointing the second pointer to a newly created empty map, and inserting the lidar data frames into the map pointed by the first pointer.

In this embodiment, before the first pointer is pointed to the map pointed by the second pointer, the map pointed by the first pointer can be destroyed first, thereby releasing a storage space occupied by the map pointed by the first pointer.

Figure 4:
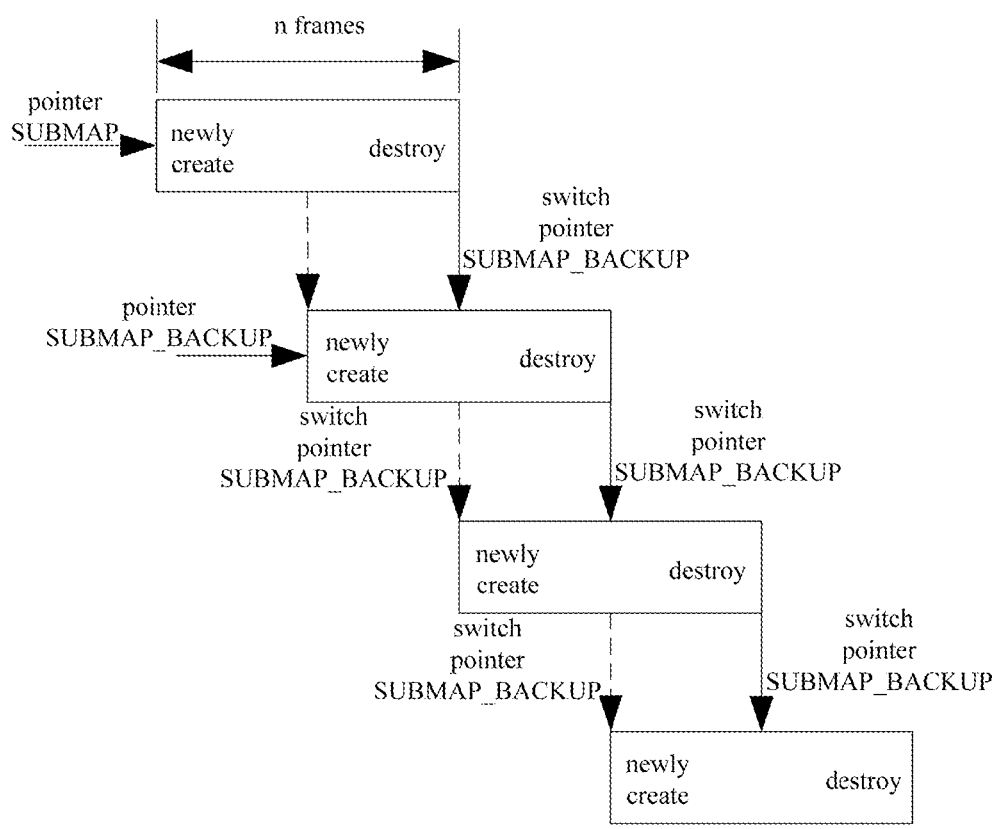
FIG. 4 is a schematic diagram of an example of using a map pointed by the first pointer and a map pointed by the second pointe in an alternating manner in the method of FIG. 1 according to an embodiment of the present disclosure.

FIG. 4 is a schematic diagram of an example of using a map pointed by the first pointer and a map pointed by the second pointer in an alternating manner in the method of FIG. 1 according to an embodiment of the present disclosure. As shown in FIG. 4, the map pointed by the first pointer is a map for performing pose calculation which is indicated as MAP1 herein, and the map pointed by the second pointer is an alternate map which is indicated as MAP2. MAP2 is created after the amount of the lidar data frames inserted into MAP1 reaches n/2 frames and starts to insert lidar data frames, hence the amount of the lidar data frames inserted into MAP1 is n/2 frames more than MAP2. After the amount of the lidar data frames inserted into MAP1 reaches n frames, the original MAP1 is destroyed, the original MAP2 is taken as the new MAP1, and an empty map is created to take as the new MAP2, and then the forgoing process is repeated. In this way, two maps with a certain difference in the amount of frames are used in an alternating manner, and the pose calculation is performed in the map with a larger amount of the lidar data frames, thereby avoiding the problem that the amount of the lidar data frames may be fewer in a scene with fixed window, which improves the calculation precision. In the present disclosure, in comparison with the manner of creating a sub-map through a sliding window for laser matching, the map will be reconstructed only when the amount of the inserted lidar data frames reaches a sufficient amount, which greatly reduces the amount of calculation, and provides a better balance between the precision and the amount of calculation.

Furthermore, after step S102 and before step S103, it can also determine whether the current pose meets a preset pose determination condition.

The pose determination condition is: a displacement of the current pose with respect to a previous pose being greater than a preset displacement threshold; a rotational angle of the current pose with respect to the previous pose being greater than a preset angle threshold; or a time difference of the current pose with respect to the previous pose being greater than a preset time threshold.

In which, the previous pose is calculated based on the previous lidar data frame inserted into the map pointed by the first pointer. The values of the displacement threshold, the angle threshold, and the time threshold may be set according to actual needs, which is not limited herein.

If the current pose meets the pose determination condition, it returns to step S103 to execute step S103 and the subsequent steps; if the current pose does not meet the pose determination condition, step S103 and the subsequent steps are not executed, and it returns to step S101 to obtain the next frame data collected by the lidar and performing an update calculation of the pose. In this way, the frequency of inserting the lidar data frames into the map can be effectively reduced, thereby reducing the frequency of reconstruction and switching the map, and further reducing the amount of calculation.

In summary, in this embodiment, it first collects lidar data frames through the lidar of the robot; calculates a current pose of the robot in a map pointed by a preset first pointer based on the lidar data frames, and obtains an amount of the lidar data frames having been inserted into the map pointed by the first pointer; inserts the lidar data frames into a map pointed by the first pointer, in response to the amount of the lidar data frames being less than a preset first threshold; inserts the lidar data frames into the map pointed by the first pointer and a map pointed by a preset second pointer, in response to the amount of the lidar data frames being greater than or equal to the first threshold and being less than a preset second threshold; and points the first pointer to the map pointed by the second pointer, points the second pointer to a newly created empty map, and inserts the lidar data frames into the map pointed by the first pointer, in response to the amount of the lidar data frames being equal to the second threshold. In the present disclosure, in comparison with the conventional manner of creating a sub-map through a fixed window for laser matching, two maps with a certain difference in the amount of frames are used in an alternating manner, and the pose calculation is performed in the map with a larger amount of the lidar data frames (i.e., the map pointed by the first pointer), thereby avoiding the problem that the amount of the lidar data frames may be fewer in a scene with fixed window, which improves the calculation precision. In the present disclosure, in comparison with the manner of creating a sub-map through a sliding window for laser matching, the map will be reconstructed only when the amount of the inserted lidar data frames reaches a sufficient amount (i.e., the second threshold), which greatly reduces the amount of calculation, and provides a better balance between the precision and the amount of calculation.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 5 is a schematic block diagram of an embodiment of a robot pose determination apparatus according to the present disclosure. As shown in FIG. 5, a pose determination apparatus for a robot having a lidar that corresponds to the robot pose determination method of the above-mentioned embodiments of FIG. 1 is provided.

In this embodiment, the robot pose determining apparatus may include:

a lidar data frame obtaining module 501 configured to collect lidar data frames through the lidar of the robot;

a pose calculation module 502 configured to calculate a current pose of the robot in a map pointed by a preset first pointer based on the lidar data frames;

a frame amount obtaining module 503 configured to obtain an amount of the lidar data frames having been inserted into the map pointed by the first pointer;

a first processing module 504 configured to insert the lidar data frames into a map pointed by the first pointer, in response to the amount of the lidar data frames being less than a preset first threshold;

a second processing module 505 configured to insert the lidar data frames into the map pointed by the first pointer and a map pointed by a preset second pointer, in response to the amount of the lidar data frames being greater than or equal to the first threshold and being less than a preset second threshold; and a third processing module 506 configured to point the first pointer to the map pointed by the second pointer, pointing the second pointer to a newly created empty map, and inserting the lidar data frames into the map pointed by the first pointer, in response to the amount of the lidar data frames being equal to the second threshold.

Furthermore, the pose calculation module may include:

an initial pose setting unit configured to set the current pose as a preset initial pose, in response to the lidar data frame being the first frame;

a predicted pose calculation unit configured to obtain odometer data and calculating a predicted pose of the robot based on the odometer data, in response to the lidar data frame being not the first frame; and a current pose calculation unit configured to perform a matching calculation in an area determined according to the predicted pose using a preset matching algorithm to obtain the current pose.

Furthermore, the predicted pose calculation unit is configured to:

calculate the predicted pose of the robot based on the following formula:

$$\text{pose\_odom\_predict} = p\_odom + v*(t\_lidar - t\_odom);$$

where, t_odom is the collection time of the odometer data, t_lidar is the collection time of the lidar data frame, p_odom is the pose in the odometer data, v is the velocity in the odometer data, and pose_odom_predict is the predicted pose.

Furthermore, the robot pose determining apparatus may further include:

a determination module configured to determine whether the current pose meets a preset pose determination condition, where the pose determination condition includes one of a displacement of the current pose with respect to a previous pose being greater than a preset displacement threshold, a rotational angle of the current pose with respect to the previous pose being greater than a preset angle threshold, or a time difference of the current pose with respect to the previous pose being greater than a preset time threshold; where the previous pose is calculated based on the previous lidar data frame inserted into the map pointed by the first pointer.

Furthermore, the robot pose determining apparatus may further include:

a storage space release unit configured to release a storage space occupied by the map pointed by the first pointer.

In this embodiment, each of the above-mentioned modules/units is implemented in the form of software, which can be computer program(s) stored in a memory of the robot pose determination apparatus and executable on a processor of the robot pose determination apparatus. In other embodiments, each of the above-mentioned modules/units may be implemented in the form of hardware (e.g., a circuit of the robot pose determination apparatus which is coupled to the processor of the robot pose determination apparatus) or a combination of hardware and software (e.g., a circuit with a single chip microcomputer).

Those skilled in the art can clearly understand that, for the convenience and brevity of the description, the specific working process of the above-mentioned apparatus, module and unit can refer to the corresponding process in the foregoing method embodiment, and details are not described herein again.

In the above-mentioned embodiments, the description of each embodiment has its focuses, and the parts which are not described or mentioned in one embodiment may refer to the related descriptions in other embodiments.

FIG. 6 is a schematic block diagram of an embodiment of a robot according to the present disclosure. For convenience of description, only parts related to this embodiment are shown.

As shown in FIG. 6, in this embodiment, the robot 6 includes a processor 60, a storage 61, a computer program 62 stored in the storage 61 and executable on the processor 60, a lidar 63. When executing (instructions in) the computer program 62, the processor 60 implements the steps in the above-mentioned embodiments of the robot pose determination method, for example, steps S101-S106 shown in FIG. 1. Alternatively, when the processor 60 executes the (instructions in) computer program 62, the functions of each module/unit in the above-mentioned device embodiments, for example, the functions of the modules 501-506 shown in FIG. 5 are implemented.

Exemplarily, the computer program 62 may be divided into one or more modules/units, and the one or more modules/units are stored in the storage 61 and executed by the processor 60 to realize the present disclosure. The one or more modules/units may be a series of computer program instruction sections capable of performing a specific function, and the instruction sections are for describing the execution process of the computer program 62 in the robot 6.

It can be understood by those skilled in the art that FIG. 6 is merely an example of the robot 6 and does not constitute a limitation on the robot 6, and may include more or fewer components than those shown in the figure, or a combination of some components or different components. For example, the robot 6 may further include an input/output device, a network access device, a bus, and the like.

The processor 60 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 61 may be an internal storage unit of the robot 6, for example, a hard disk or a memory of the robot 6. The storage 61 may also be an external storage device of the robot 6, for example, a plug-in hard disk, a smart media card (SMC), a secure digital (SD) card, flash card, and the like, which is equipped on the robot 6. Furthermore, the storage 61 may further include both an internal storage unit and an external storage device, of the robot 6. The storage 61 is configured to store the computer program 62 and other programs and data required by the robot 6. The storage 61 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented pose determination method for a robot having a lidar, comprising executing on a processor steps of:
   collecting lidar data frames through the lidar of the robot;
   calculating, according to the collected lidar data frames, a current pose of the robot in a map whose memory address is pointed by a preset first pointer, inserting the lidar data frames in the map, and counting an amount of the inserted lidar data frames; and
   processing step a, b, or c, according to the counted amount; a. inserting the lidar data frames into the map whose memory address is pointed by the first pointer, in response to the counted amount being less than a preset first threshold;
   b. inserting the lidar data frames simultaneously into the map whose memory address is pointed by the first pointer and a backup map whose memory address is pointed by a preset second pointer, in response to the counted amount being greater than or equal to the first threshold and being less than a preset second threshold; or
   c. switching the first pointer to the memory address of the backup map, switching the second pointer to a memory address of a newly created empty map in response to the counted amount being equal to the second threshold, and inserting the lidar data frames simultaneously into the map whose memory address is currently pointed by the first pointer and the map whose memory address is currently pointed by the second pointer.

2. The method of claim 1, wherein the step of calculating, according to the collected lidar data frames, the current pose of the robot in the map whose memory address is pointed by the preset first pointer comprises:
   setting the current pose as a preset initial pose, in response to a currently collected lidar data frame being a first frame;
   obtaining odometer data and calculating a predicted pose of the robot according to the odometer data, in response to the currently collected lidar data frame not being the first frame; and
   obtaining the current pose by performing a matching calculation on an area determined according to the predicted pose using a preset matching algorithm to obtain the current pose.

3. The method of claim 2, wherein the step of calculating the predicted pose of the robot according to the odometer data comprises:
   calculating the predicted pose of the robot based on the following formula:

$$\text{pose\_odom\_predict} = p\_odom + v*(t\_lidar - t\_odom);$$

where, t_odom is the collection time of the odometer data, t_lidar is the collection time of the lidar data frame, p_odom is the pose in the odometer data, v is the velocity in the odometer data, and pose_odom_predict is the predicted pose.

4. The method of claim 1, wherein after the step of calculating, according to the collected lidar data frames, the current pose of the robot in the map whose memory address is pointed by the preset first pointer, further comprises:
   determining whether the current pose meets a preset pose determination condition, wherein the pose determination condition includes one of a displacement of the current pose with respect to a previous pose being greater than a preset displacement threshold, a rotational angle of the current pose with respect to the previous pose being greater than a preset angle threshold, or a time difference of the current pose with respect to the previous pose being greater than a preset time threshold; wherein the previous pose is calculated based on the lidar data frame inserted into the map whose memory address is pointed by the first pointer;
   returning to the step of counting the amount of the inserted lidar data frames in the map whose memory address is pointed by the first pointer, in response to the current pose meeting the pose determination condition; and
   returning to the step of collecting the lidar data frames, in response to the current pose not meeting the pose determination condition.

5. The method of claim 1, wherein before the step of switching the first pointer to the memory address of the backup map further comprises:
   releasing a storage space occupied by the map whose memory address is pointed by the first pointer.

6. A pose determination apparatus for a robot having a lidar, comprising:
   a lidar data frame obtaining module configured to collect lidar data frames through the lidar of the robot;
   a pose calculation module configured to calculate, according to the collected lidar data frames, a current pose of the robot in a map whose memory address is pointed by a preset first pointer;
   a frame amount obtaining module configured to insert the lidar data frames in the map, and count an amount of the inserted lidar data frames;
   a first processing module configured to insert the lidar data frames into the map whose memory address is pointed by the first pointer, in response to the counted amount being less than a preset first threshold;
   a second processing module configured to insert the lidar data frames simultaneously into the map whose memory address is pointed by the first pointer and a backup map whose memory address is pointed by a preset second pointer, in response to the counted amount being greater than or equal to the first threshold and being less than a preset second threshold; and
   a third processing module configured to switch the first pointer to the memory address of the backup map, switch the second pointer to a memory address of a newly created empty map in response to the counted amount being equal to the second threshold, and insert the lidar data frames simultaneously into the map whose memory address is currently pointed by the first pointer and the map whose memory address is currently pointed by the second pointer.

7. The apparatus of claim 6, wherein the pose calculation module comprises:
an initial pose setting unit configured to set the current pose as a preset initial pose, in response to a currently collected lidar data frame being a first frame;
a predicted pose calculation unit configured to obtain odometer data and calculate a predicted pose of the robot according to the odometer data, in response to the currently collected lidar data frame not being the first frame; and
a current pose calculation unit configured to obtain the current pose by performing a matching calculation on an area determined according to the predicted pose using a preset matching algorithm to obtain the current pose.

8. The apparatus of claim 7, wherein the predicted pose calculation unit is configured to:
calculate the predicted pose of the robot based on the following formula:

$$\text{pose\_odom\_predict} = p\_\text{odom} + v * (t\_\text{lidar} - t\_\text{odom});$$

where, t_odom is the collection time of the odometer data, t_lidar is the collection time of the lidar data frame, p_odom is the pose in the odometer data, v is the velocity in the odometer data, and pose_odom_predict is the predicted pose.

9. A robot, comprising:
a lidar;
a memory;
a processor; and
one or more computer programs stored in the memory and executable on the processor, wherein the one or more computer programs comprise:
instructions for collecting lidar data frames through the lidar;
instructions for calculating, according to the collected lidar data frames, a current pose of the robot in a map whose memory address is pointed by a preset first pointer, inserting the lidar data frames in the map, and counting an amount of the inserted lidar data frames;
instructions for processing instructions a, b, or c, according to the counted amount;
a. instructions for inserting the lidar data frames into the map whose memory address is pointed by the first pointer, in response to the counted amount being less than a preset first threshold;
b. instructions for inserting the lidar data frames simultaneously into the map whose memory address is pointed by the first pointer and a backup map whose memory address is pointed by a preset second pointer, in response to the counted amount being greater than or equal to the first threshold and being less than a preset second threshold; or
c. instructions for switching the first pointer to the memory address of the backup map, switching the second pointer to a memory address of a newly created empty map in response to the counted amount being equal to the second threshold, and inserting the lidar data frames simultaneously into the map whose memory address is currently pointed by the first pointer and the map whose memory address is currently pointed by the second pointer.

10. The robot of claim 9, wherein the instructions for calculating, according to the collected lidar data frames, the current pose of the robot in the map whose memory address is pointed by the preset first pointer comprise:
instructions for setting the current pose as a preset initial pose, in response to a currently collected lidar data frame being a first frame;
instructions for obtaining odometer data and calculating a predicted pose of the robot according to the odometer data, in response to the currently collected lidar data frame not being the first frame; and
instructions for obtaining the current pose by performing a matching calculation on an area determined according to the predicted pose using a preset matching algorithm to obtain the current pose.

11. The robot of claim 10, wherein the instructions for calculating the predicted pose of the robot according to the odometer data comprise:
instructions for calculating the predicted pose of the robot based on the following formula:

$$\text{pose\_odom\_predict} = p\_\text{odom} + v * (t\_\text{lidar} - t\_\text{odom});$$

where, t_odom is the collection time of the odometer data, t_lidar is the collection time of the lidar data frame, p_odom is the pose in the odometer data, v is the velocity in the odometer data, and pose_odom_predict is the predicted pose.

12. The robot of claim 9, wherein the one or more computer programs further comprise:
instructions for determining whether the current pose meets a preset pose determination condition, wherein the pose determination condition includes one of a displacement of the current pose with respect to a previous pose being greater than a preset displacement threshold, a rotational angle of the current pose with respect to the previous pose being greater than a preset angle threshold, or a time difference of the current pose with respect to the previous pose being greater than a preset time threshold; wherein the previous pose is calculated based on the lidar data frame inserted into the map whose memory address is pointed by the first pointer;
instructions for returning to the counting the amount of the inserted lidar data frames in the map whose memory address is pointed by the first pointer, in response to the current pose meeting the pose determination condition; and
instructions for returning to the collecting, through the lidar, the lidar frames, in response to the current pose not meeting the pose determination condition.

13. The robot of claim 9, wherein the one or more computer programs further comprise:
instructions for releasing a storage space occupied by the map whose memory address is pointed by the first pointer.

14. The method of claim 1, wherein the first threshold is n/2 and the second threshold is n, where n is an even number greater than two.

15. The apparatus of claim 6, wherein the first threshold is n/2 and the second threshold is n, where n is an even number greater than two.

16. The robot of claim 9, wherein the first threshold is n/2 and the second threshold is where n is an even number greater than two.

17. The method of claim 2, wherein the odometer data is one of data of a wheel odometer, data of an inertial measurement unit, and data of a chassis odometer that combines the data of the wheel odometer and the data of the inertial measurement unit.

18. The apparatus of claim 7, wherein the odometer data is one of data of a wheel odometer, data of an inertial measurement unit, and data of a chassis odometer that combines the data of the wheel odometer and the data of the inertial measurement unit.

19. The robot of claim 10, wherein the odometer data is one of data of a wheel odometer, data of an inertial measurement unit, and data of a chassis odometer that combines the data of the wheel odometer and the data of the inertial measurement unit.

* * * * *